United States Patent [19]

Campbell

[11] 4,162,445
[45] Jul. 24, 1979

[54] DIGITAL SPEEDOMETER

[76] Inventor: Scott Campbell, 2025 E. Whiting, Apt. G, Fullerton, Calif. 92632

[21] Appl. No.: 859,583

[22] Filed: Dec. 12, 1977

[51] Int. Cl.$^2$ .................... G01P 3/36; G01R 25/00
[52] U.S. Cl. ................................ 324/175; 324/166
[58] Field of Search ............... 324/175, 166, 167, 173, 324/174

[56] References Cited

U.S. PATENT DOCUMENTS

| | | | |
|---|---|---|---|
| 3,704,445 | 11/1972 | Lanham | 324/175 |
| 3,729,996 | 5/1973 | Metz | 324/175 |
| 4,031,466 | 6/1977 | Krause et al. | 324/175 |

Primary Examiner—Rudolph V. Rolinec
Assistant Examiner—Ernest F. Karlsen
Attorney, Agent, or Firm—Fulwider, Patton, Rieber, Lee & Utecht

[57] ABSTRACT

A digital speedometer is provided for use in an automotive vehicle and includes a transducer for connection to a conventional speedometer cable driver. The transducer is equipped with an optical encoder that produces electrical pulses in response to rotational motion of the speedometer cable driver. The electrical pulses are transmitted to a counting circuit which is reset by a variable reference oscillator. The frequency of the oscillator is much lower than the frequency of pulses from the transducer. Accordingly, a number of pulses from the transducer indicative of the speed of the vehicle are tabulated by the counting device during intervals between reset pulses from the reference oscillator. The period between reset pulses is determined by an adjustment to the oscillator to vary the output frequency thereof. The number of counts tabulated during each period is passed to a visual display.

9 Claims, 3 Drawing Figures

DIGITAL SPEEDOMETER

FIELD OF THE INVENTION

The present invention relates to a digital speedometer for use with vehicles having internal electrical power sources. In particular, the invention relates to digital speedometers for automotive vehicles such as automobiles, trucks and motorcycles.

BACKGROUND OF THE INVENTION

Historically, automotive vehicles have been provided with mechanical speedometers in which the rotation of a wheel of the vehicle or of a drive component of the transmission is transmitted as a torsional impulse on a cable. The torsional force applied to the cable is typically transmitted to a needle in the instrument panel which is deflected across a scale to indicate the speed at which the vehicle is traveling.

Various attempts have been made to provide digital speedometers to replace the conventional mechanical analog variety of speedometers. All previous attempts to provide such digital speedometers have involved certain disadvantages that have prevented their commercial acceptance. One principal disadvantage with such systems has been the requirement for a signal generating system independent of the conventional mechanical speedometer system with which automotive vehicles are supplied as matter of course. The requirement for a separate signal generator adds considerably to the expense of a digital speedometer and necessitates the inconvenience and disadvantage of adding a data gathering system to the vehicle which the vehicle is not designed to accomodate.

Another distinct disadvantage of digital speedometers currently available is the inflexibility of their design for adaptation to vehicles of different design. The wheel size, transmission ratio, and voltage and current characteristics in the electrical systems of different styles of automotive vehicles has heretofor required a different calibration of a digital speedometer for the particular vehicle with which it is to be used. Such calibration in the past has been provided by using programmable storage devices, thumbwheel switches, and other cumbersome, expensive and inconvenient means for adapting a particular digital speedometer for use with a particular vehicle.

SUMMARY OF THE INVENTION

It is an object of the present invention to provide a digital speedometer for an automotive vehicle which employs a transducer to receive an input from a conventional speedometer drive mechanism without the necessity of providing a separate speed measuring system.

Another object of the invention is to provide a digital speedometer which is adaptable for use with virtually any automotive vehicle and which may be calibrated permanently for any specific vehicle with only a very minor initial adjustment. Calibration may thereby be performed without programming and without any wiring change whatsoever. Only the adjustment of a variable resistor in a component element of the system is required. Furthermore, although adjustment is but a minor task, it still does not require the manipulation of exposed controls which might inadvertently be changed thereby resulting in an in properly calibrated instrument.

DESCRIPTION OF THE DRAWINGS

The invention may be described with greater particularly and detail by reference to the accompanying drawing figures in which:

Referring now to FIG. 2, a digital speedometer 10 is illustrated which is designed for use in an automotive vehicle. The speedometer 10 includes a transducer 11 indicated in detail in FIG. 1. The transducer 11 includes a shaft 12 carrying a rotatable member in the form of a disk 13 and is arranged for mounting on the vehicle and for engagement with a speedometer driver located within a housing and conventionally supplied as standard equipment on the vehicle.

Figure 1:
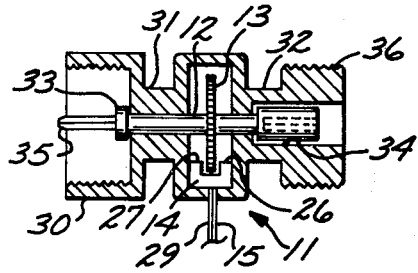
FIG. 1 is a sectional view of the transducer unit of the invention.

An optical encoder 14 is operatively associated with the disk 13 for sensing the speed of rotation thereof and for emitting pulses on a connection line 15 at a pulse rate responsive to the rate of rotation of the disk 13. The optical encoder 14 transmits pulses to a counting means which includes two decade counters 17 and 18. A display is provided and is comprised of light emitting diodes arranged to form a two digit display. The light emitting diodes are arranged in two separate arrays 19 and 20. Each array is comprised of seven separate LEDs conventionally arranged to display a selected numeral zero through nine. The display arrays 19 and 20 are remotely located from the transducer 11 and are respectively connected to the counters 17 and 18 for displaying image representations of the pulses received by these counters.

Figure 3:
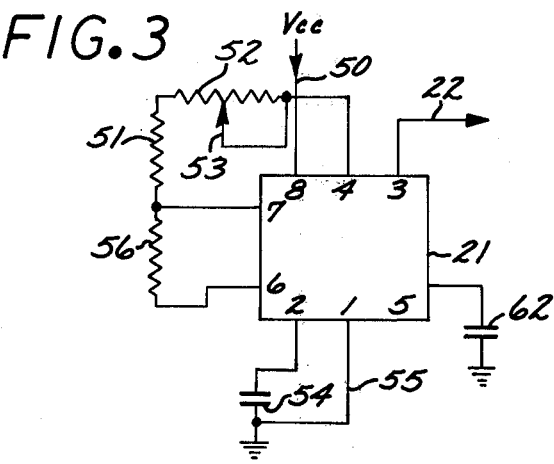
FIG. 3 is a schematic diagram of the variable reference oscillator.

A variable reference oscillator 21 is connected to the counters 17 and 18 for emitting electrical reset pulses at a predetermined frequency less than the frequency of pulse emission from the optical encoder 14 in order to clear the counters 17 and 18 and contemporaneously transmit a signal causing the previously recorded count to be displayed on LED displays 19 and 20. An oscillator adjustment is provided as depicted in FIG. 3 to vary the frequency of the output of the variable reference oscillator 21. The adjustable oscillator 21 resets the counters 17 and 18 by means of signals over lines 24 at the rate of oscillator output which is independent of the pulse rate from optical encoder 14.

A power line 25 is provided for obtaining electrical energy for the various components of the digital speedometer. The power line 25 is adapted for connection to the electrical system of the automotive vehicle.

Figure 2:
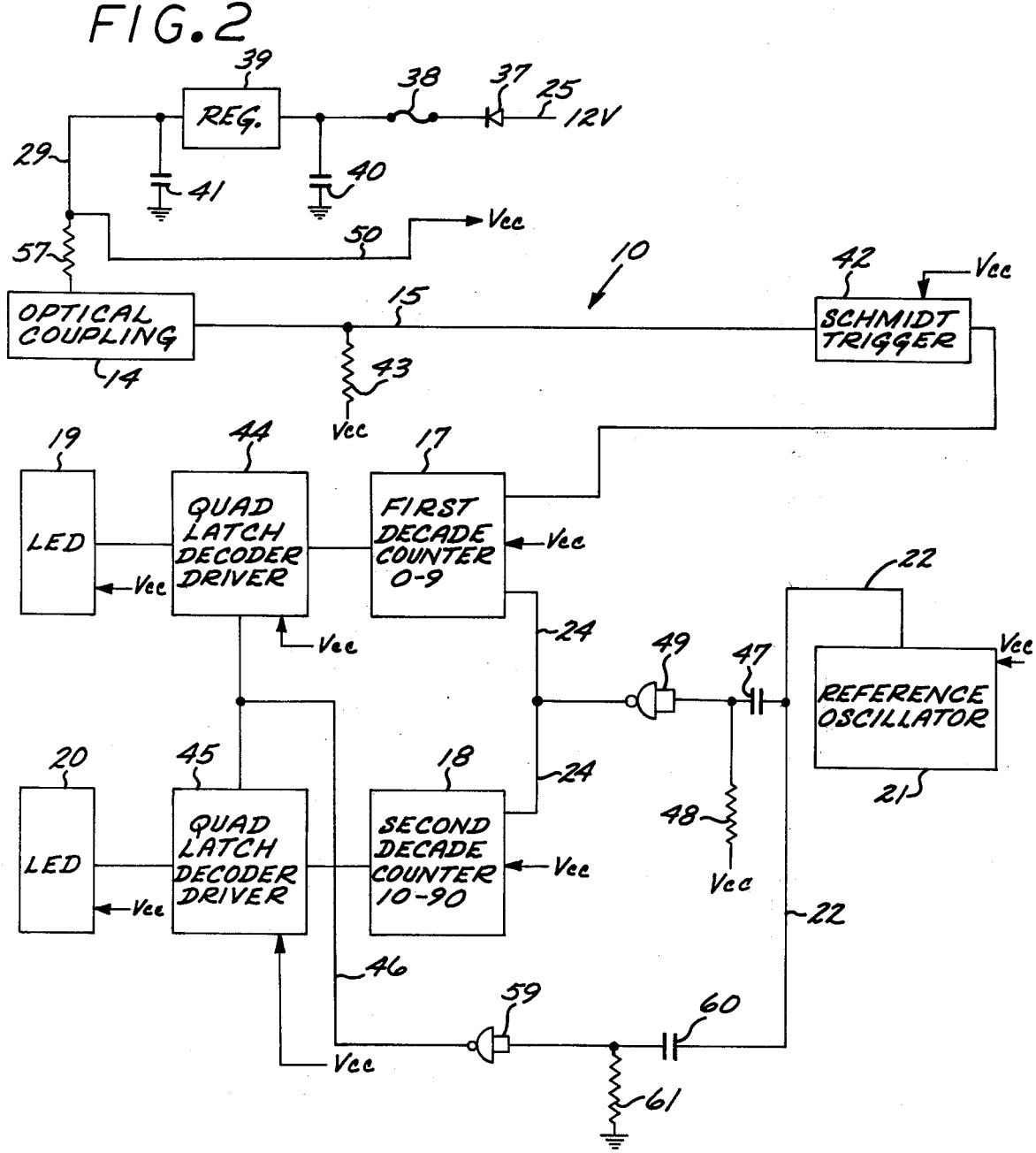
FIG. 2 is a block diagram of the circuit elements of the digital speedometer.

The optical encoder 14 includes a photoemitter 26 and a photodetector 27 separated from the photoemitter 26 for receiving a beam of light therefrom transmitted along the path 28. The disk 13 is a gear mounted for rotation on a shaft 12 and secured thereto by a weld, a keyway, or other conventional means. The gear 13 rotates in a plane passing between the photoemitter 26 and the photodetector 27, and the shaft 12 rotates about an axis parallel to the path 28 of the beam of light between the photoemitter 26 and photodetector 27. Because of the teeth provided about the periphery of the gear 13, equally spaced discontinuities are formed at the interstitial spaces between the teeth in the gear 13 at a uniform radial distance from the axis of the shaft 12. This distance is equal to the distance of separation between the axis of the shaft 12 and the path 28 of the beam of light between the photoemitter 26 and photodetector 27. Electrical leads 15 and 29 lead from the optical encoder or coupling unit 14 to the remainder of the electrical circuitry depicted in FIG. 2. Typically, all of the electrical components of the digital speedometer with the exception of the optical encoder 14 are located remotely from the transducer 11.

The transducer 11 is located within an adapter housing comprised of several threaded annular fittings 30, 31 and 32, which are secured together and which together support the shaft 12 for rotation and encase the gear 13 and the optical encoder 14. The shaft 12 is longitudinally restrained by bushings 33 and 34 located at the extremities thereof and within the confines of fittings 30 and 32 respectively. Beyond the bushing 33, and extending toward a rotatable speedometer driver located within a housing in the automotive vehicle, the shaft 12 terminates in a male fitting 35 designed to engage with a female termination of the automotive vehicle speedometer driver. The fittings, of course, are dependent upon the particular fitting convention of the vehicle, and may well be reversed from the arrangement depicted in FIG. 1.

The fitting 30 is adapted to engage a threaded nipple annularly positioned about the speedometer driver of the automotive vehicle and extending outward from a housing. Thus, the transducer 11 may be securely attached to the automotive vehicle at the fitting 30, with the speedometer driver of the automotive vehicle arranged to rotate the shaft 12 through the shaft termination 35. Typically the point of attachment of the transducer 11 to the automotive vehicle is at either a wheel housing of the vehicle or at the transmission housing of the vehicle, since the speedometer driver is conventionally located in one of these two places.

It may be desirable not to replace the conventional mechanical speedometer supplied as original equipment with the automotive vehicle with the digital speedometer of this invention, but rather to provide the digital speedometer as an additional feature. For this reason, it may be desireable for the bushing 34 to be shaped with an axial recess of square configuration to receive the male end of the speedometer cable leading to the mechanical speedometer register supplied with the vehicle as factory equipment. The casing for this conventional speedometer cable terminates in an internally threaded annular collar which may be engaged about the fitting 32 at the externally threaded section 36. Thus, the transducer 11 forms an adapter unit which is interposed between the housing for the conventional speedometer cable. Electrical leads 15 and 29 emanate from a lateral port for connection to the remainder of the electrical circuitry of the digital speedometer and for connection to the electrical power system of the vehicle.

The power line 29 is connected to a conventional 12 volt lead storage battery at connection 25. Between the line 29 and the connection 25 a diode 37 is connected as a polarity protection device for a regulator 39. A fuse 38, is also interposed to prevent overloading of the circuit. The electrical power connection also includes the voltage regulator 39, which may be of conventional design, but which should have a reasonably stable output. Preferably, the voltage regulator 39 reduces the 12 volt direct current down to five volts to serve as a Vcc power supply for the electrical components depicted. Capacitor 40 is connected to ground on the input side of the voltage regulator 39 to add to the stability of the power supply, and the capacitor 41 is provided to smooth the regulator output. A resistor 57 is connected to regulator 39 to drop the voltage received at optical encoder 14.

The electrical lead 14 receives the Vcc supply through a resistor 43 and is connected to the counter 17 through a pulse shaping mechanism 42, which may be a Schmitt trigger of conventional design. The Schmitt trigger 42 shapes the pulses from the optical encoder 14 to a square waveform. These pulses are transmitted to the input of counter 17. Similarly, the variable reference oscillator 21 is also connected to a pulse shaping device such as the Schmitt trigger with an inverted output at 49 in which the inputs from line 22 are tied together with the output connected to the reset leads 24 of the decade counters 17 and 18. The oscillator pulses are likewise shaped to a square waveform for transmission to the counters.

The frequency of pulses from the oscillator 21 is much less than the frequency of pulses from the optical encoder 14. Thus, pulses from the optical encoder 14 are rapidly transmitted to the counter 17 at a rate determined by the speed of the vehicle. The counter 17 is connected with its overflow into counter 18. The counters 17 and 18 count during the intervals between reset pulses on lines 24, which intervals are controlled by the pulse rate of the variable reference oscillator 21. Since the frequency of pulses from the optical encoder 14 is much greater than the frequency of pulses from the oscillator 21, a relatively large number of pulses will be received by the counters 17 and 18 from the optical encoder 14 during the interval between reset pulses from oscillator 21. For example, if the gear 13 is one inch in pitch diameter, the frequency of pulses from the optical encoder 14 for a vehicle traveling at 50 mph is about 135 hertz. In contrast, the frequency of the output of the variable reference oscillator 21 is of the order of 2.7 hertz. Thus, it can be seen that with this frequency ratio, 50 pulses from the optical encoder 14 are received by counters 17 and 18 between consecutive reset pulses from the reference oscillator 21.

Between reset pulses from the variable reference oscillator 21, pulses from the optical encoder 14 are transmitted to the first decade counter 17 and the associated overflow counter 18. The decade counter 17 counts from zero to nine. With the tenth pulse the decade counter 17 overflows into the decade counter 18. Thus, with each overflow of the counter 17, the counter 18 is incremented. If 52 pulses are transmitted to the counter 17 during a period of time between reset pulses from the variable oscillator 21, two counts are registered in decade counter 17 and five counts are registered in decade counter 18.

A buffer storage means is provided as part of the digital speedometer 10 in the form of quad latch decoder drivers 44 and 45. The quad latch decoder driver 44 is associated with the decade counter 17 while the quad latch decoder driver 45 is associated with the decade counter 18. The counts in the counter 17 and 18 are transmitted to and stored in the associated quad latch decoder driver as they are received therein. The quad latch decoder drivers 44 and 45 also receive a display entry signal from the oscillator 21 over the line 46. Each reset pulse provided to the Schmitt trigger 49 from the oscillator 21 also serves as an update signal on line 22 to NAND gate through a capacitor 60. A resistor 61 is connected to ground between capacitor 60 and NAND gate 59 to bleed any residual charge from the capacitor 60 between oscillator pulses. From a square-wave input on line 22, each signal from variable oscillator 21 is transformed to an inverted voltage spike periodically dropping the voltage on line 46 to zero from an otherwise steady state +5 d.c. voltage level.

Each signal on line 46 is a display entry signal which directs the decoder drivers 44 and 45 to transmit their contents to the light emitting diode arrays 19 and 20 respectively. Thus, while the counters 17 and 18 and the quad latch decoder drivers 44 and 45 are receiving new input pulses from the optical encoder 14, the LED display arrays 19 and 20 are displaying the digital representation of the number of input pulses received during the previous counting cycle and which had been stored by the quad latch decoder drivers 44 and 45.

In providing the reset signals to the counters 17 and 18, the signals on line 22 are transmitted to a capacitor 47. As the charge is built up in the capacitor 47 throughout the duration of each output pulse from the oscillator 21, a charge level is reached at which the Schmitt trigger 49 is actuated. The capacitor 47 is connected to the Vcc supply through a resistor 48. The reset pulse at the output of Schmitt trigger 49 is transmitted to both of the decade counters 17 and 18 over identical lines 24 to clear the contents of these decade counters. Thus, the contents of the counters 17 and 18 are immediately erased at the termination of each pulse from the variable reference oscillator 21. By this time, however, the counts have been stored in the quad latch decoder drivers 44 and 45.

FIG. 3 is an enlarged view of the pin connections to the variable reference oscillator 21. The oscillator 21 may, for example, be a conventional 555 oscillator. In this case, the oscillator output is to pin connection 3 on line 22, while the supply voltage is supplied on line 50 to pin connections 4 and 8. A resistor 51, which may, for example, be 100 K ohms is connected between pins 7 and 8 and to pin 4 as indicated. A fixed resistor 56 of 2.2 megohms is connected in series with resistor 51 between pins 6 and 7. A wiper connection 53 in circuit with pin 8 forms an adjustable contact with a 500 K variable resistor pot 52, the wiper connection 53 in turn is connected to pin 7. A timing capacitor 54 is connected between pins 1 and 2 and grounded. The capacitor 54, may, for example, have a value of 0.1 microfarads. Pin 1 is also connected to ground by line 55 as indicated and pin 5 is connected to ground through a 0.05 microfarad capacitor 62.

To adjust the variable resistor formed by the pot 52 and wiper 53 in order to alter the output voltage applied for the generation of electrical gating pulses from the oscillator 21, some simple form of mechanical adjustment is provided. For example, the wiper 53 is typically moved by merely turning a screw with a screwdriver.

In the operation of the circuit, power is supplied to the digital speedometer over line 25, and dispersed to the various components of the digital speedometer over lines 29 and 50. As the wheel or transmission gear of the vehicle turns, the speedometer driver turns the terminal fitting 35 of the shaft 12. This rotates gear 13, the teeth of which periodically break the beam of light transmitted on the path 28 between the photoemitter 26 and the photodetector 27. As a result, photodetector 27 responds to the series of flashes of light produced as the light beam passes between the teeth of the gear 13. The photodetector 27 emits electrical pulses in response to and in synchronization with the intermittent light flashes. These pulses, of course, represent the speed of the vehicle since the rate at which the shaft 12 is turned is proportional to vehicle speed and governs the frequency of pulses appearing on the line 15.

The pulses from the optical encoder 14 are shaped by the Schmitt trigger 42 and are transmitted to the counter 17. Concurrently, reset pulses of a much lower frequency are generated by the variable reference oscillator 21, shaped by the Schmitt trigger 49 and transmitted as reset signals to the counters 17 and 18. As pulses from the optical encoder 14 are received by the decade counters 17 and 18, they are all registered in the quad latch decoder drivers 44 and 45. The generation of each new pulse from the variable reference oscillator 21 provides a display entry signal on line 46 to the quad latch decoder drivers 44 and 45. Upon receipt of a display entry signal, the quad latch decoder drivers 44 and 45 transmit their contents to LED arrays 19 and 29, which may be mounted side by side in or near the instrument panel of the vehicle.

The counters 17 and 18 are free running devices, so that as they are cleared by the reset pulses from the oscillator 21, they immediately begin accumulating counts again from the optical encoder 14. Although the counters 17 and 18 are erased by the reset pulses, their contents is not lost for but are stored in the quad latch decoder drivers 44 and 45 and strobed out by the entry signals on line 46.

As previously explained, the variable reference oscillator 21 is calibrated initially by adjustment of the wiper 53 along the 500 K resistor pot 52. Calibration is performed by driving the shaft 12 through the speedometer driver of a particular vehicle at a known rate of speed. The wiper 53 is then adjusted so that the pulse frequency produced on the output line 22 of the variable reference oscillator 21 is varied to lengthen or shorten the interval between reset pulses. This allows a greater number or fewer number of pulses from the optical encoder 14 to be received and registered in the counters 17 and 18. Once the numeric display on the LED arrays 19 and 20 is equal to the known rate of speed of the vehicle, the digital speedometer 10 has been properly calibrated and need not be adjusted again as long as it remains connected to the same vehicle.

It is apparent that the digital speedometer 10 of this invention is readily adaptable for use with virtually any automotive vehicle. It may be installed as either original equipment or as an accessory for an automotive vehicle. Because of the solid state electrical components which are used, the digital speedometer 10 is extremely reliable and displays the speed of the vehicle to within two percent accuracy, even at elevated speeds where conventional speedometers are notoriously inaccurate.

The foregoing disclosure and illustration of the embodiment of the invention depicted should not be considered limiting, as numerous modifications and variations of the invention will become readily apparent to those familiar with automotive speedometers. For example, it is quite apparent that circuitry for an odometer could readily be incorporated as an adjunct to the invention. Such circuitry would require only a counting device, such as counters similar to the counters 17 and 18, connected to the line 15. These counters would not be reset, but rather would be connected to increment a conventional mechanical odometer indicator. Thus, the odometer reading would be preserved even if the contents of such counters where to be cleared by virtue of failure of the vehicle power system, or for any other reason. Also, the connection of counters to increment a mechanical indicator would free the counters for re-use so that an inordinately large number of digital counters would not be required.

I claim:

1. A digital speedometer for use in an automotive vehicle having an electrical power system and a rotatable mechanical speedometer driver comprising:

a transducer arranged for mounting on said vehicle and adapted for engagement with said speedometer driver that is located within a vehicle transmission line housing in an automotive vehicle, wherein said transducer includes:

a transducer housing with an annular threaded fitting adapted to threadably engage with a threaded speedometer driver access port in an said automotive vehicle transmission line housing, a shaft mounted for rotation within said transducer housing and having a termination at one end adapted for mechanical coupling with said speedometer driver and arranged coaxially within said threaded fitting, a rotatable member carried upon said shaft, an optical encoder operatively associated with said rotatable member for sensing speed of rotation thereof and for emitting pulses at a pulse rate responsive thereto, an electrical signal lead extending from said transducer housing, an electrical power lead extending from said transducer housing and connected to said vehicle power system, counting means coupled to receive pulses from said optical encoder on said electrical signal lead, and having a reset, buffer storage means connected to said counting means and having latch enabling means which, when enabled, load an accumulated pulse count from said counting means into said buffer storage means, display means remotely located from said transducer and connected to said buffer storage means for displaying an image representation of the number of pulses loaded in said buffer storage means, a variable oscillator for emitting periodic electrical pulses at a predetermined frequency less than the frequency of pulse emission from said optical encoder and having a common output connected both to said reset of said counting means and to said latch enabling means of said buffer storage means, to both enable said buffer storage means and thereafter to reset said counting means with the same pulse, oscillator adjustment means for varying the frequency of oscillator output, and electrical connections for obtaining electrical energy for said counting means, said display means, said buffer storage means, and for said oscillator and adapted for connection to the electrical power system of said automotive vehicle.

2. The digital speedometer of claim 1 wherein said optical encoder includes a photoemitter and a photodetector separated from said photoemitter for receiving a beam of light therefrom, and said rotatable member is a disk mounted on said shaft for rotation in a plane passing between said photoemitter and photodetector and about an axis parallel to said beam of light and said disk includes equally spaced discontinuities therein located a uniform radial distance from said axis which distance is equal to the distance of separation between said axis and said beam of light.

3. The digital speedometer of claim 2 wherein said disk is a gear, the interstitial spaces between the teeth of which form the aforesaid spaced discontinuities.

4. The digital speedometer of claim 1 further comprising pulse shaping means connected between said counting means and said optical encoder and between said counting means and said variable oscillator.

5. The digital speedometer of claim 1 further comprising buffer storage means interposed between said counting means and said display means and having a connection for receiving display entry signals from said variable oscillator.

6. The digital speedometer of claim 1 wherein said reset means includes a delay circuit interposed between said oscillator and said counting means.

7. The digital speedometer of claim 1 wherein said oscillator adjustment means includes a variable resistor to alter the input voltage applied for the generation of said electrical gating pulses.

8. The digital speedometer of claim 1 wherein said display means comprises light emitting diode arrays arranged to form a two digit display.

9. The digital speedometer of claim 1 further characterized in that a voltage regulator is interposed in said power line to regulate the voltage supply to a direct current voltage of constant level.

* * * * *